United States Patent [19]

Takeda et al.

[11] Patent Number: 5,654,842
[45] Date of Patent: Aug. 5, 1997

[54] HEAD DISPLACEMENT MEASURING METHOD AND APPARATUS AND DATA RECORDING/REPRODUCING METHOD AND APPARATUS

[75] Inventors: Toru Takeda, Saitama; Satoru Seko, Kanagawa; Takehisa Ishida, Miyagi, all of Japan

[73] Assignee: Sony Corporation, Tokyo, Japan

[21] Appl. No.: 519,405

[22] Filed: Aug. 25, 1995

[30] Foreign Application Priority Data

Aug. 30, 1994 [JP] Japan .................................. 6-205272

[51] Int. Cl.⁶ .................................................. G11B 5/596
[52] U.S. Cl. ...................... 360/77.06; 369/44.13; 360/77.17; 360/75; 360/31
[58] Field of Search ..................... 369/44.13; 360/77.17, 360/77.02, 75, 31, 53, 77.06

[56] References Cited

U.S. PATENT DOCUMENTS

| | | | |
|---|---|---|---|
| 3,126,535 | 3/1964 | Streeter | 360/77.17 |
| 4,223,187 | 9/1980 | Yonezawa | 360/77.06 |
| 4,481,550 | 11/1984 | Miller | 360/77.06 |
| 4,802,033 | 1/1989 | Chi | 360/77.04 |
| 4,862,294 | 8/1989 | Mihara | 360/77.02 |
| 4,967,289 | 10/1990 | Kanota | 360/46 |
| 5,073,833 | 12/1991 | Best | 360/77.05 |
| 5,235,478 | 8/1993 | Hoshimi | 360/135 |
| 5,353,170 | 10/1994 | Fung | 360/77.13 |
| 5,383,070 | 1/1995 | Bond | 360/77.02 |

FOREIGN PATENT DOCUMENTS 479703  4/1992  European Pat. Off. .......... 360/75

*Primary Examiner*—A. Psitos
*Assistant Examiner*—Alan Faber
*Attorney, Agent, or Firm*—Jay H. Maioli

[57] ABSTRACT

In a head displacement measuring method, prior to actual data recording or data reproduction, either one of the recording head and the reproducing head is wobbled, and the test data is recorded in the disk-shaped recording medium by the recording head. Then, the test data is reproduced from the test data by the reproducing head, and displacement between the recording head and the reproducing head is detected on the basis of the reproduced test data. Thus, the displacement may be detected more easily with higher precision than with the conventional optical detecting method.

16 Claims, 9 Drawing Sheets

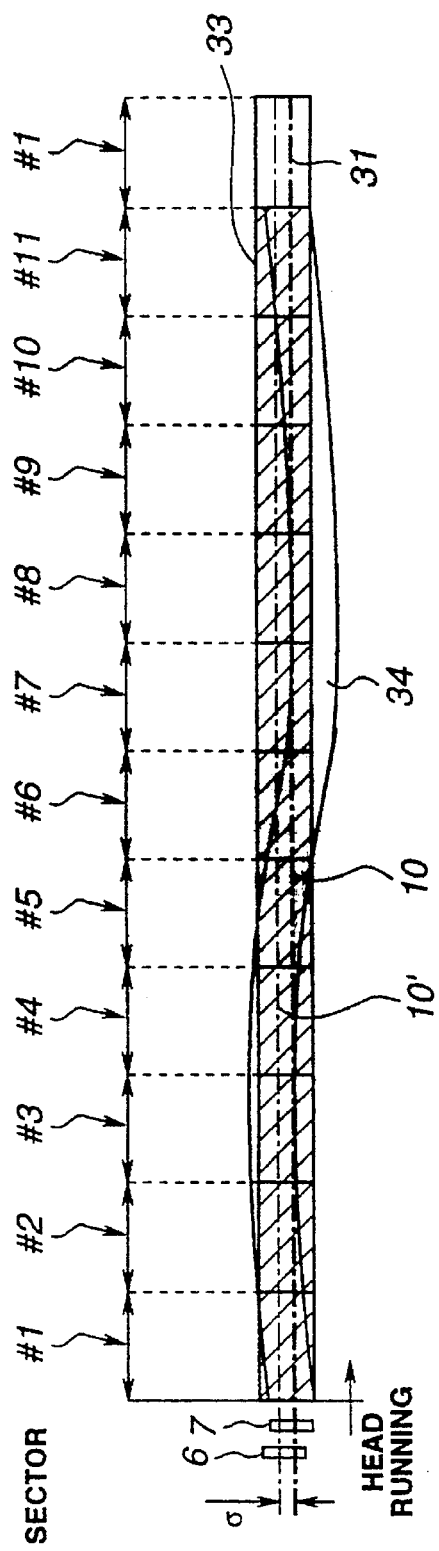

HEAD DISPLACEMENT MEASURING METHOD AND APPARATUS AND DATA RECORDING/REPRODUCING METHOD AND APPARATUS

BACKGROUND OF THE INVENTION

1. Field of the Invention

This invention relates to a head displacement measuring method, a data recording/reproducing method, a head displacement measuring apparatus and a data recording/reproducing apparatus, for example, for a magnetic disk device in which a recording head for recording data on a magnetic disk and a reproducing head for reproducing data from the magnetic disk are separately provided.

2. Description of the Related Art

In some magnetic disk devices for recording data on a disk-shaped recording medium, such as, a magnetic disk, and reproducing data from the magnetic disk, a so-called magneto-resistive (MR) head is employed as a reproducing head to improve reproduction sensitivity. In such magnetic disk device having an inductive recording head and an MR reproducing head, the reproducing head is set to be smaller in width than the recording head, that is, the width of the reproducing head is made smaller than the width of a track formed by scanning on the magnetic disk by the recording head. Thus, even when the recording head and the reproducing head are integrally formed with centers thereof displaced from each other and therefore when the center of the reproducing head is displaced from the center of the track formed by the recording head operational problems do not emerge.

With this technique, however, since the width of the recording head must be designed to be redundantly large, the recording density cannot be increased.

Thus, there is a magnetic disk device which reduces the redundancy in designing and realizes higher recording density by equalizing the width of the recording head and that of the reproducing head, then optically measuring displacement of the center of the reproducing head from that of the recording head using, for example, a microscope, then supplying the displacement as an amount of correction (hereinafter referred to as offset) to a positioning (tracking) servo circuit, and adding or subtracting the offset to or from a position error signal (tracking error signal) indicating a position error to correct the tracking position of the recording head or the reproducing head. However, it is costly and time-consuming to measure the displacement of the center of the reproducing head from that of the recording head. In addition, the above-mentioned technique is not responsive to temporal changes.

OBJECT AND SUMMARY OF THE INVENTION

In view of the foregoing, it is an object of the present invention to provide a head displacement measuring method and a head displacement measuring apparatus whereby displacement of the reproducing head from the recording head can be easily measured, and a data recording/reproducing method and a data recording/reproducing apparatus whereby data can be recorded/reproduced correctly even when the reproducing head is displaced from the recording head.

According to the present invention, there is provided a head displacement measuring method including the steps of recording test data in a disk-shaped recording medium by a recording head, wobbling a reproducing head in a radial direction of the disk-shaped recording medium to reproduce the test data from the disk-shaped recording medium by the reproducing head, and detecting displacement between the recording head and the reproducing head on the basis of the reproduced test data.

According to the present invention, there is also provided a head displacement measuring method including the steps of wobbling a recording head in a radial direction of a disk-shaped recording medium to record test data in the disk-shaped recording medium by the recording head, reproducing the test data from the disk-shaped recording medium by a reproducing head, and detecting displacement between the recording head and the reproducing head on the basis of the reproduced test data.

According to the present invention, there is also provided a head displacement measuring method including the steps of recording test data in a disk-shaped recording medium by a recording head, wobbling a reproducing head in a radial direction of the disk-shaped recording medium, and detecting displacement between the recording head and the reproducing head on the basis of a reproducing signal corresponding to the test data outputted from the reproducing head.

According to the present invention, there is also provided a head displacement measuring method including the steps of wobbling a recording head in a radial direction of a disk-shaped recording medium to record test data in the disk-shaped recording medium by the recording head, and detecting displacement between the recording head and a reproducing head on the basis of a reproducing signal corresponding to the test data outputted from the reproducing head when the test data is reproduced from the disk-shaped recording medium by the reproducing head.

According to the present invention, there is also provided a data recording/reproducing method including the steps of, prior to actual data recording or data reproduction, recording test data in a disk-shaped recording medium by a recording head, wobbling a reproducing head in a radial direction of the disk-shaped recording medium to reproduce the test data from the disk-shaped recording medium by the reproducing head, detecting displacement between the recording head and the reproducing head on the basis of the reproduced test data, and in the actual data recording or data reproduction, correcting a position of the recording head or the reproducing head on the basis of the detected displacement.

According to the present invention, there is also provided a data recording/reproducing method including the steps of, prior to actual data recording or data reproduction, wobbling a recording head in a radial direction of a disk-shaped recording medium to record test data in the disk-shaped recording medium by the recording head, reproducing the test data from the disk-shaped recording medium by a reproducing head, detecting displacement between the recording head and the reproducing head on the basis of the reproduced test data, and in the actual data recording or data reproduction, correcting a position of the recording head or the reproducing head on the basis of the detected displacement.

According to the present invention, there is also provided a data recording/reproducing method including the steps of, prior to actual data recording or data reproduction, recording test data in a disk-shaped recording medium by a recording head, wobbling a reproducing head in a radial direction of the disk-shaped recording medium, detecting displacement between the recording head and the reproducing head on the basis of a reproducing signal corresponding to the test data outputted from the reproducing head, and in the actual data recording or data reproduction, correcting a position of the recording head or the reproducing head on the basis of the detected displacement.

According to the present invention, there is also provided a data recording/reproducing method including the steps of, prior to actual data recording or data reproduction, wobbling a recording head in a radial direction of a disk-shaped recording medium to record test data in the disk-shaped recording medium by the recording head, detecting displacement between the recording head and a reproducing head on the basis of a reproducing signal corresponding to the test data outputted from the reproducing head when the test data is reproduced from the disk-shaped recording medium by the reproducing head, and in the actual data recording or data reproduction, correcting a position of the recording head or the reproducing head on the basis of the detected displacement.

According to the present invention, there is also provided a head displacement measuring apparatus including a recording head for recording test data in a disk-shaped recording medium, a reproducing head being wobbled in a radial direction of the disk-shaped recording medium to reproduce the test data from the disk-shaped recording medium, and head displacement detection means for detecting displacement between the recording head and the reproducing head on the basis of the test data reproduced by the reproducing head.

According to the present invention, there is also provided a head displacement measuring apparatus including a recording head being wobbled in a radial direction of a disk-shaped recording medium to record test data in the disk-shaped recording medium, a reproducing head for reproducing the test data from the disk-shaped recording medium, and head displacement detection means for detecting displacement between the recording head and the reproducing head on the basis of the test data reproduced by the reproducing head.

According to the present invention, there is also provided a head displacement measuring apparatus including a recording head for recording test data in a disk-shaped recording medium, a reproducing head being wobbled in a radial direction of the disk-shaped recording medium to reproduce the test data from the disk-shaped recording medium, and head displacement detection means for detecting displacement between the recording head and the reproducing head on the basis of a reproducing signal corresponding to the test data outputted from the reproducing head.

According to the present invention, there is also provided a head displacement measuring apparatus including a recording head being wobbled in a radial direction of a disk-shaped recording medium to record test data in the disk-shaped recording medium, a reproducing head for reproducing the test data from the disk-shaped recording medium, and head displacement detection means for detecting displacement between the recording head and the reproducing head on the basis of a reproducing signal corresponding to the test data outputted from the reproducing head.

According to the present invention, there is also provided a data recording/reproducing apparatus including a recording head for recording data in a disk-shaped recording medium, a reproducing head for reproducing data from the disk-shaped recording medium, wobbling means for wobbling the reproducing head in a radial direction of the disk-shaped recording medium, and correction means for, prior to actual data recording or data reproduction, recording test data in the disk-shaped recording medium by the recording head, wobbling the reproducing head by wobbling means to reproduce the test data from the disk-shaped recording medium, detecting displacement between the recording head and the reproducing head on the basis of the reproduced test data, and in the actual data recording or data reproduction, correcting a position of the recording head or the reproducing head on the basis of the detected displacement.

According to the present invention, there is also provided a data recording/reproducing apparatus including a recording head for recording data in a disk-shaped recording medium, a reproducing head for reproducing data from the disk-shaped recording medium, wobbling means for wobbling the recording head in a radial direction of the disk-shaped recording medium, and correction means for, prior to actual data recording or data reproduction, wobbling the recording head by wobbling means to record test data in the disk-shaped recording medium, reproducing the test data from the disk-shaped recording medium by the reproducing head, detecting displacement between the recording head and the reproducing head on the basis of the reproduced test data, and in the actual data recording or data reproduction, correcting a position of the recording head or the reproducing head on the basis of the detected displacement.

According to the present invention, there is provided a data recording/reproducing apparatus including a recording head for recording data in a disk-shaped recording medium, a reproducing head for reproducing data from the disk-shaped recording medium, wobbling means for wobbling the reproducing head in a radial direction of the disk-shaped recording medium, and correction means for, prior to actual data recording or data reproduction, recording test data in the disk-shaped recording medium by the recording head, detecting displacement between the recording head and the reproducing head on the basis of a reproducing signal corresponding to test data output from the reproducing head when the reproducing head is wobbled by the wobbling means to reproduce the test data from the disk-shaped recording medium, and in the actual data recording or data reproduction, correcting a position of the recording head or the reproducing head on the basis of the detected displacement.

According to the present invention, there is further provided a data recording/reproducing apparatus including a recording head for recording data in a disk-shaped recording medium, a reproducing head for reproducing data from the disk-shaped recording medium, wobbling means for wobbling the recording head in a radial direction of the disk-shaped recording medium, and correction means for, prior to actual data recording or data reproduction, wobbling the recording head by the wobbling means to record test data in the disk-shaped recording medium, detecting displacement between the recording head and the reproducing head on the basis of a reproducing signal corresponding to the test data outputted from the reproducing head when the test data is reproduced from the disk-shaped recording medium by the reproducing head, and in the actual data recording or data reproduction, correcting a position of the recording head or the reproducing head on the basis of the detected displacement.

With the present invention, prior to actual data recording or data reproduction, either one of the recording head and the reproducing head is wobbled, and the test data is recorded in the disk-shaped recording medium by the recording head. Then, the test data is reproduced from the test data by the reproducing head, and displacement between the recording head and the reproducing head is detected on the basis of the reproduced test data. Thus, the displacement may be detected more easily with higher precision than with the conventional optical detecting method.

Also, with the present invention, prior to actual data recording or data reproduction, either one of the recording head and the reproducing head is wobbled, and the test data is recorded in the disk-shaped recording medium by the recording head. When the test data is reproduced from the disk-shaped recording medium by the reproducing head, displacement between the recording head and the reproducing head is detected on the basis of the reproducing signal output from the reproducing head. Thus, the present invention is responsive to temporal changes. Stated differently, the displacement need not be measured on the manufacturing stage, so that production costs may be reduced.

In addition, with the present invention, the position of the recording head or the reproducing head is corrected on the basis of the detected displacement in the actual data recording or data reproduction. Thus, even when the reproducing head is displaced from the recording head or vice versa, the recording head and the reproducing head scan the same position so that data may be reproduced correctly.

BRIEF DESCRIPTION OF THE DRAWINGS

FIGS.4A and 4B show another example of wobbling of the reproducing head.

DESCRIPTION OF THE PREFERRED EMBODIMENTS

Preferred embodiments of the head displacement measuring method, the data recording/reproducing method, the head displacement measuring apparatus and the data recording/reproducing apparatus according to the present invention will now be described with reference to the attached drawings.

Figure 1:
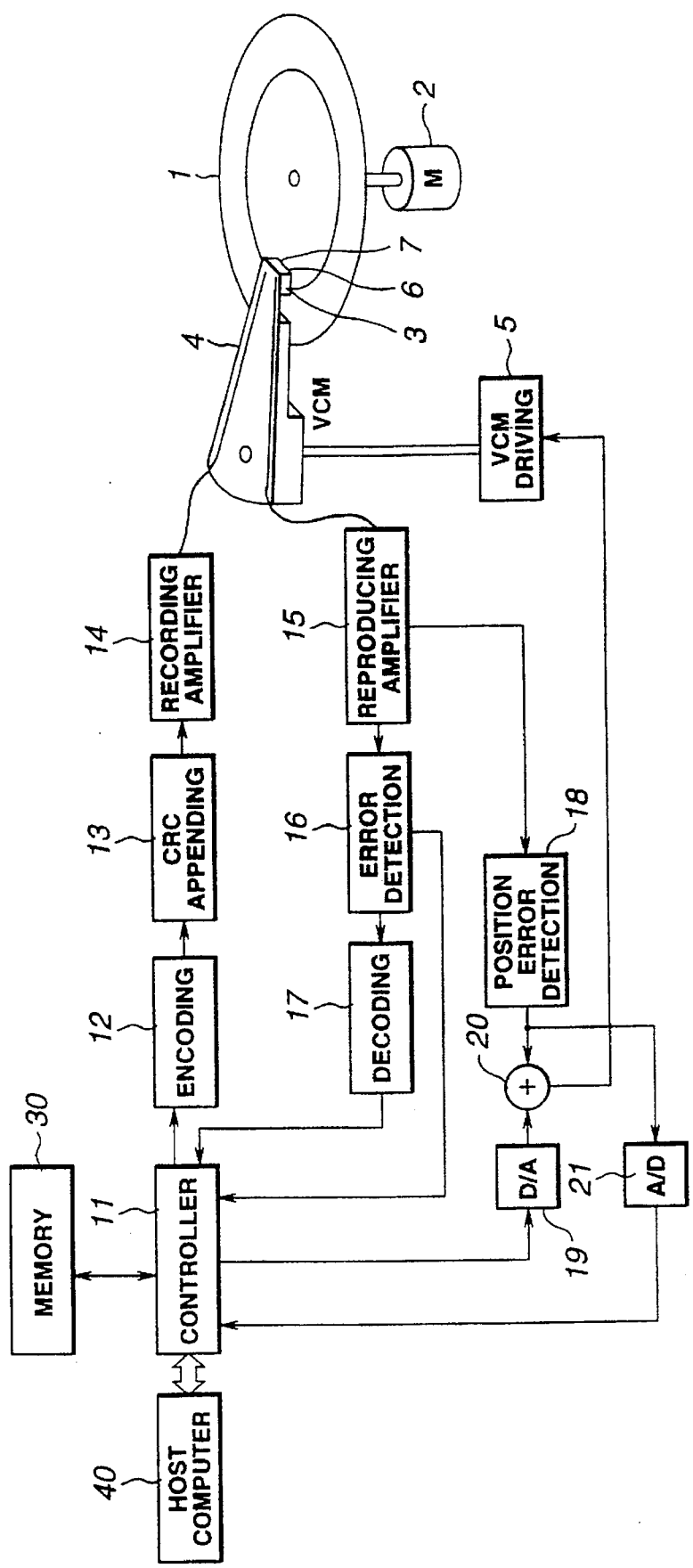
FIG.1 is a block diagram showing a specific structure of essential portions of a magnetic disk device to which the present invention applies.

In a first embodiment, the present invention applies to a magnetic disk device using a magnetic disk as a disk-shaped recording medium, an inductive head as a recording head, and a magneto-resistive (MR) head as a reproducing head. FIG.1 is a block diagram showing the structure of essential portions of this magnetic disk device.

The magnetic disk device to which the present invention applies has a controller 11 for generating test data and outputting the test data or data from a host computer 40, an encoding circuit 12 for encoding the data or test data from the controller 11, a cyclic redundancy check (CRC) appending circuit 13 for appending a CRC code to the data encoded by the encoding circuit 12, a recording amplifier 14 for generating a recording signal based upon the data with the CRC code appended thereto by the CRC appending circuit 13, a recording head 6 for recording the data on a magnetic disk 1 on the basis of the recording signal from the recording amplifier 14, and a reproducing head 7 for reproducing data from the magnetic disk 1, as shown in FIG.1. The magnetic disk device also has a reproducing amplifier 15 for amplifying a reproducing signal from the reproducing head 7 and binarizing the reproducing data, an error detection circuit 16 for detecting an error of the reproducing data from the reproducing amplifier 15 using the CRC code, and a decoding circuit 17 for decoding the reproducing data from the error detection circuit 16 to reproduce the original data.

In actual data recording or data reproduction, the controller 11 supplies to the encoding circuit 12 data supplied via a so-called small computer system interface (SCSI) from the host computer 40.

The encoding circuit 12 encodes the data in accordance with code rules suitable for recording data on the magnetic disk 1, and supplies the encoded data to the CRC appending circuit 13.

The CRC appending circuit 13 appends the CRC code to the encoded data supplied from the encoding circuit 12, and supplies the resulting recording data to the recording amplifier 14. The recording amplifier 14 generates a recording signal based upon the recording data to drive the recording head 6 by this recording signal.

The magnetic disk device also has a motor 2 for rotationally driving the magnetic disk 1, a head 3 constituted integrally by the recording head 6 and the reproducing head 7, an arm 4 for moving the head 3 in a radial direction of the magnetic disk 1, and a voice coil motor (VCM) driving circuit 5 for rotationally driving the arm 4, as shown in FIG.1.

The magnetic disk i is rotationally driven at a constant angular velocity or constant linear velocity by the motor 2. The arm 4 is rotationally driven about its axis by a VCM driven by the VCM driving, circuit 5, to move the head 3 in the radial direction of the magnetic disk 1. The head 3 is moved under servo control as later described, so that the head 3 is positioned, that is, the recording head 6 and the reproducing head 7 are positioned. By providing the recording signal to the recording head 6 which is positioned, a track on which the recording signal based upon the data (hereinafter referred to simply as data) is recorded is formed on the recording surface of the magnetic disk 1.

On the other hand, the data is reproduced from the magnetic disk 1 as follows. The reproducing head 7 is also positioned under servo control. The reproducing head 7 travels on a target track of the magnetic disk 1, to supply the reproducing signal to the reproducing amplifier 15.

The reproducing amplifier 15 is constituted by an amplifier, an equalizer and a binarization circuit. The reproducing amplifier 15 amplifies the reproducing signal supplied from the reproducing head 7, then equalizes the waveform, and binarizes the reproducing signal to output reproducing data.

The error detection circuit 16 detects an error of the reproducing data supplied from the reproducing amplifier 15 using the CRC code, and performs error correction of the reproducing data. The error detection circuit 16 supplies results of the error detection to the controller 11, and supplies the error-corrected reproducing data to the decoding circuit 17.

The decoding circuit 17, corresponding to the encoding circuit 12 in the recording system, decodes the reproducing data to output and supply the original data to the controller 11. The controller 11 outputs the data supplied from the decoding circuit 17 via the SCSI to the host computer 40.

The data recording on the magnetic disk 1 and the data reproduction from the magnetic disk 1 are thus carried out. In this magnetic disk device, displacement between the center of the recording head 6 and that of the reproducing head 7 is measured and stored in a memory 30 before actual data recording or data reproduction is carried out, for example, immediately after the power is turned on. In the actual data recording or data reproduction, positioning (tracking) servo control of the recording head 6 or the reproducing head 7 is performed in consideration of the displacement.

Figure 2:
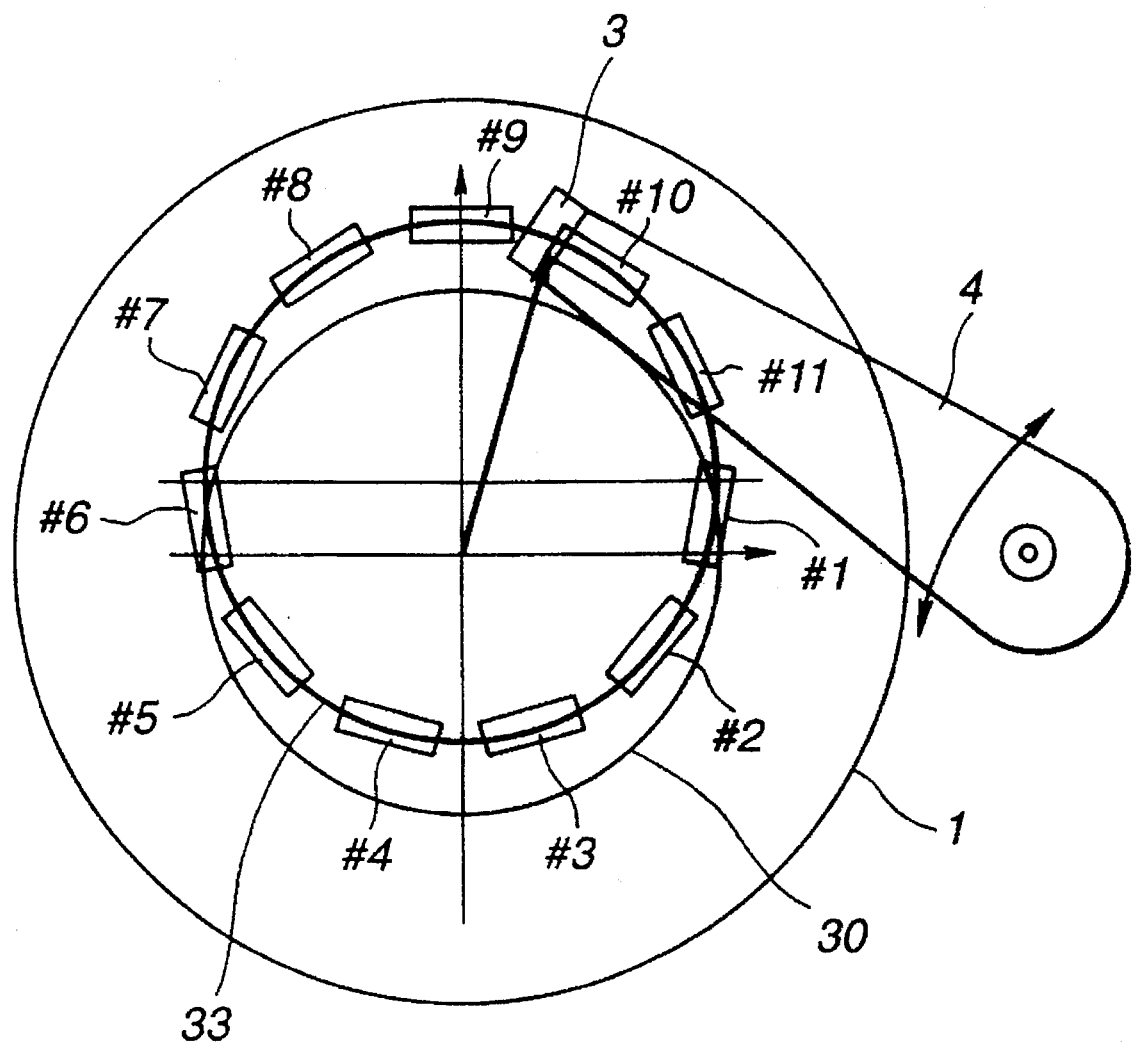
FIG.2 shows a format of a track of a magnetic disk used in the magnetic disk device.

Specifically, 11 sectors from sector #1 to sector #11 are provided on one track 30, as shown in FIG.2. In each of the sectors #1 to #11, data of 512 bytes may be recorded. FIG.2 shows the sectors #1 to #11 in the case where wobbling is performed in recording, as later described.

Figures 3A, 3B:
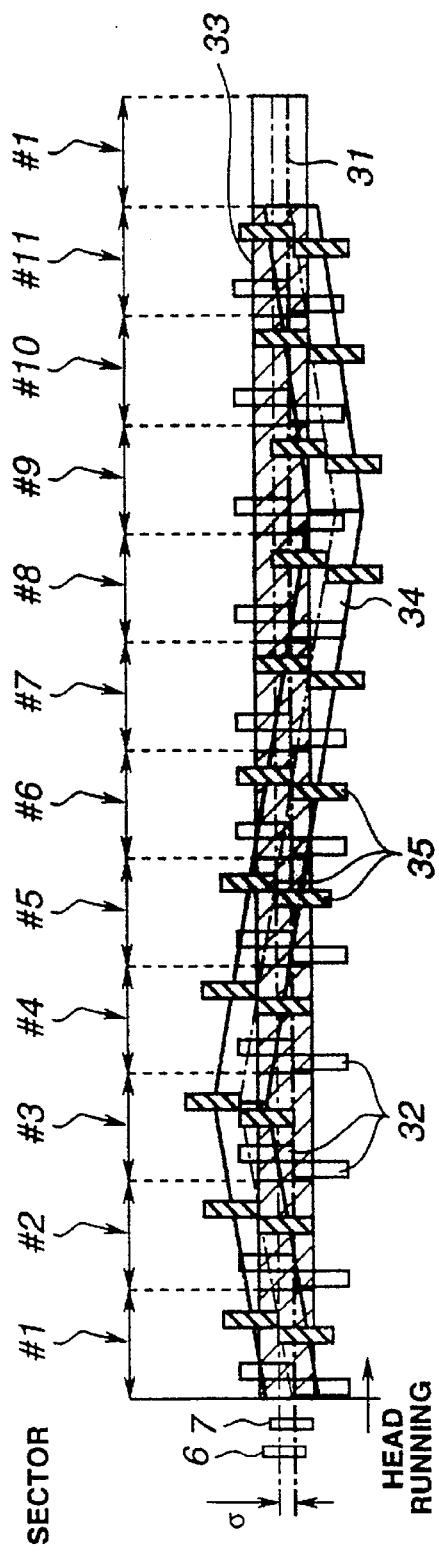
FIGS.3A and 3B show a specific example of wobbling of a reproducing head constituting the magnetic disk device.

On each track of the magnetic disk 1, recording head positioning marks 32 for positioning the recording head 6 are formed by printing or marking above and below the center 31 of the track and in a leading portion of each of the sectors #1 to #11, as shown in FIG.3A. These recording head positioning marks 32 are produced by magnetizing a top portion of a boss approximately 0.2 μm higher than its peripheral portions in a direction opposite to the magnetizing direction of the peripheral portions. In FIG. 3A, the track 30 of FIG.2 is cut at a point of θ=0° and is expanded.

This magnetic disk device for recording or reproducing data on or from the magnetic disk 1 has a position error detection circuit 18 for detecting displacement of the reproducing head 7 from the center 31 of the track on the basis of the reproducing signal from the reproducing amplifier 15, a digital-to-analog converter (D/A converter) 19 for converting modulation data for wobbling the head 3 from the controller 11 into a modulation signal, an adder 20 for adding the position error signal from the position error .detection circuit 18 and the modulation signal from the D/A converter 19 to output the added signal to the VCM driving circuit 5, and an analog-to-digital converter (A/D converter) 21 for converting the position error signal from the reproducing amplifier 15 into data and supplying the resulting data to the controller 11, as shown in FIG.1.

Prior to actual data recording, for example, when the power is turned on, the position error detection circuit 18 detects the position error signal indicating displacement of the center of the reproducing head 7 from the center 31 of the track, for example, a difference in level between the reproducing signals of the two recording head positioning marks 32 displaced above and below the center 31 of the track on the basis of the reproducing signal resulting from reproducing the recording head positioning marks 32 and supplied from the reproducing amplifier 15. Then, the position error detection circuit 18 supplies the detected position error signal to the adder 20.

The controller 11 supplies the modulation data as all-zero data to the D/A converter 19, which then converts the modulation data to an analog signal and supplies the analog signal to the adder 20. The adder 20 supplies the position error signal from the position error detection circuit 18 directly to the VCM driving circuit 5. The VCM driving circuit 5 drives the VCM for rotationally driving the arm 4 by the position error signal supplied from the adder 20. Thus, the servo control is performed so that the center of the reproducing head 7 constituting the head 3 conforms to the center 31 of the track.

With the center of the reproducing head 7 conforming to the center 31 of the track, the controller 11 supplies 11 sectors of predetermined data, such as, test data composed of identical 512 bytes to the encoding circuit 12. Consequently, the recording signal based upon the test data (hereinafter referred to simply as the test data) is recorded in the sectors #1 to #11 of a recording track 33 of the magnetic disk 1.

Meanwhile, the center of the recording head 6 and that of the reproducing head 7 do not necessarily conform to each other, as described in the conventional technique. When the center of the recording head 6 is displaced by an amount of δ from the center of the reproducing head 7, as shown in FIGS.3A and 4A, the test data is recorded in a position displaced by δ from the center 31 of the track, forming the recording track 33.

Then, the controller 11 supplies to the D/A converter 19 modulation data for wobbling the reproducing head 7, that is, for shifting the reproducing head 7 by f(θ) from a complete-round track with a radius $R_0$.

Figure 5:
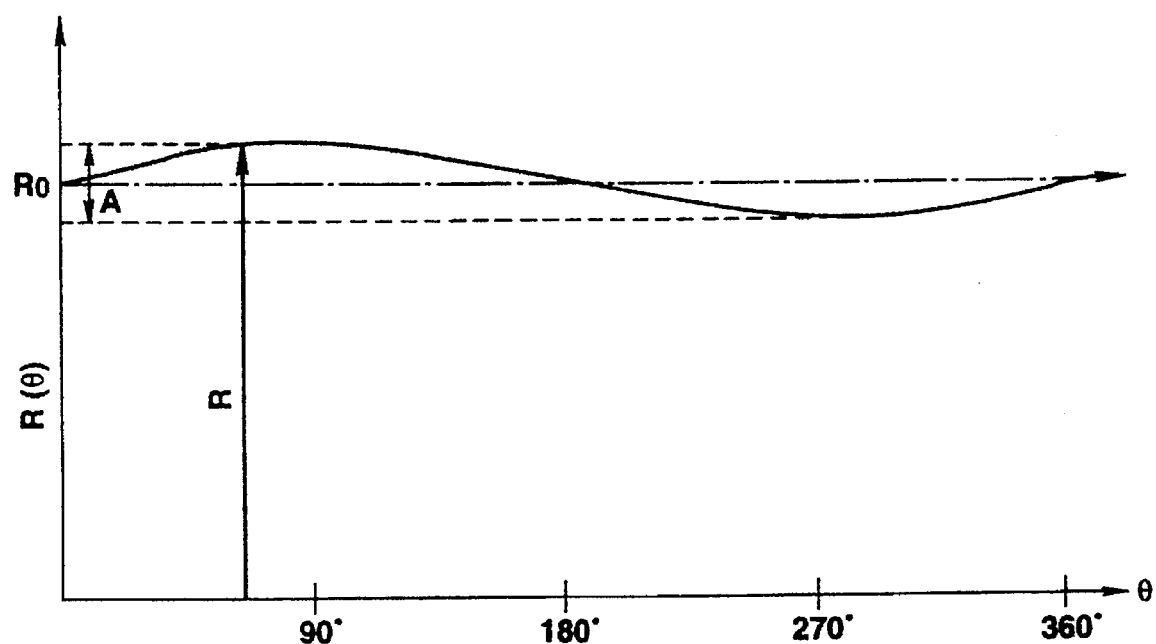
FIG.5 shows a specific example of modulation data.

Specifically, the controller 11 supplies to the D/A converter 19 the modulation data in the form of a sine wave with amplitude A and having one rotation of the magnetic disk 1 as one cycle, as expressed by the following equation (1), that is, as shown in FIG.5.

$$f(\theta) = A \times \sin(\theta) \qquad (1)$$

The D/A converter 19 converts the modulation data of the sine wave to a modulation signal, and supplies the signal to the adder 20. Since the output of the position error detection circuit 18 is 0, the adder 20 supplies the modulation signal from the D/A converter 19 directly to the VCM driving circuit 5. Consequently, the reproducing head 7 is shifted in the form of sine wave in the radial direction from the center 31 of the track to scan an area 34 of the magnetic disk 1, as shown in FIG.4A. If the value of the amplitude A is set to ½ of the maximum amplitude (so-called p-p value) of the position error signal, the reproducing head 7 meanders with a shift of 0.5 tracks from the center 31 of the track on the magnetic disk 1.

The test data reproduced by the meandering reproducing head 7 has no error in a portion where the shift is small, and has an error in a portion where the shift is great. Thus, the controller 11 calculates displacement δ between the center of the recording head 6 and that of the reproducing head 7 on the basis of the presence/absence of the error in each sector.

That is, the controller 11 detects the displacement δ between the center of the recording head 6 and that of the reproducing head 7 based on the following equation (2)

$$\begin{aligned}\delta &= d \times \sin(\theta) \\ &= d \times \sin(360° \times m/N)\end{aligned} \qquad (2)$$

where N denotes the number of sectors in one track, d (=A/2) the maximum shift of the reproducing head 7, and m the optimum sector number having no error.

Specifically, on the assumption that the number of sectors N is 11 and the maximum shift d is 0.5 tracks, as shown in FIG.4A, and that the optimum sector number m is 5, as shown in FIG.4B, θ becomes 164 (=360×5/11)° and the displacement δ becomes 0.14 (=0.5×sin 164°) tracks from the equation (2). That is, the recording head 6 is displaced by a distance corresponding to 0.14 tracks in a direction of toward the outer circle (positive direction) from the reproducing head 7. In FIG.4B, a sector having no error is denoted by "NO ERROR" and a sector having an error is denoted by "ERROR". If the track pitch is 10.0 μm, the recording head 6 is displaced by 1.4 (=10.0×0.14) μm from the reproducing head 7.

The detection results exhibit higher precision than in the optical measurement as described in the conventional technique. Also, this magnetic disk device is responsive to temporal changes of the displacement δ by periodically measuring the displacement δ between the center of the recording head 6 and that of the reproducing head 7 when the power is turned on or when the data recording or reproduction is not carried out. Stated differently, the displacement δ need not be measured in the manufacturing stage, and the displacement δ may be easily measured on the basis of presence/absence of the error so that the production costs may be reduced. Although the displacement δ is measured on the basis of presence/absence of the error in the magnetic disk device of this first embodiment, the displacement may also be measured on the basis of the magnitude of a so-called bit error rate.

On completion of calculation of the displacement δ between the center of the recording head 6 and that of the reproducing head 7, the controller 11 stores the calculated value in the memory 30. The controller 11 corrects the position of the recording head 6 or the reproducing head 7 on the basis of the displacement δ stored in the memory 30 in actual data recording or data reproduction.

Specifically, the controller 11 reads out data corresponding to the displacement δ from the memory 30, and supplies the data as an amount of correction (offset) to the D/A converter 19. The adder 20 adds the offset of a constant value to the position error signal changed by external disturbance from the position error detection circuit 18, and supplies the added value to the VCM driving circuit 5.

When the offset is given to the recording head 6, the controller 11 supplies the data corresponding to the displacement δ as the offset to the D/A converter 19 in the data recording. The adder 20 adds the offset from the D/A converter 19 to the position error signal supplied from the position error detection circuit 18. Consequently, the recording head 6 is servo-controlled so that the center of the recording head 6 conforms to the center 31 of the track. The data recording is carried out with the recording head 6 thus controlled.

When the data recorded in this manner is reproduced, the controller 11 supplies data having a value 0 to the D/A converter 19. With this data, the reproducing head 7 is servo-controlled so that the center of the reproducing head 7 conforms to the center 31 of the track for data reproduction. Thus, even when the center of the recording head 6 is displaced from that of the reproducing head 7 or vice versa, the recording head 6 and the reproducing head 7 may scan the same position, and the data can be correctly reproduced. Even when magnetic disk devices having different displacements δ are employed, the data can be correctly reproduced by measuring the displacement δ when the power is turned on.

On the other hand, when the offset is given to the reproducing head 7, the controller 11 supplies data having a value 0 to the D/A converter 19 in data recording. Consequently, the recording head 6 records data at a position displaced by δ from the center 31 of the track to form the recording track 33.

In data reproduction, the controller 11 supplies data corresponding to the displacement δ as the offset to the D/A converter 19. The adder 20 adds the position error signal supplied from the position error detection circuit 18 to this offset. Consequently, the reproducing head 7 is servo-controlled so that the center of the reproducing head 7 conforms to the center of the recording track 33 which is displaced by δ from the center 31 of the track. With the reproducing head 7 servo-controlled, the data reproduction is carried out. Thus, even when the center of the recording head 6 is displaced from that of the reproducing head 7 or vice versa, the reproducing head 7 may scan the recording track 33 formed by the recording head 6 so that the data can be correctly reproduced.

Meanwhile, though the reproducing head 7 is positioned using the recording head positioning marks 32 in recording the test data in the magnetic disk device of the first embodiment, the reproducing head 7 may also be positioned tentatively at the center 31 of the track without using the recording head positioning marks 32.

Another example of wobbling of the reproducing head 7 will now be described.

As the modulation data for wobbling the reproducing head 7, modulation data in the form of a triangular wave with a slope of ±A and having one rotation of the magnetic disk 1 as one cycle is employed, as expressed by the following equation (3).

$$f(\theta) = A \times \theta \quad (0 \leq \theta < \pi/2) \quad (3)$$
$$= -A\theta + B \quad (\pi/2 \leq \theta < 3\pi/2)$$
$$= A \times \theta \quad (3\pi/2 \leq \theta < 2\pi)$$

If the amplitude A×π of the triangular wave is 2 tracks, the reproducing head 7 meanders with a shift of ±1.0 track from the center 31 of the track, as shown in FIG.3A.

In this case, the controller 11 calculates the displacement δ between the center of the recording head 6 and that of the reproducing head 7 on the basis of the following equation (4)

$$\delta = 1.0 \times f(\theta) \quad (4)$$

where N denotes the number of sectors in one track, d (=A×π/2) the maximum shift of the reproducing head 7, and m the optimum sector number having no error.

Specifically, on the assumption that the optimum sector number m is 1 and that the maximum shift d is 1.0 track, as shown in FIG.3B, θ becomes 16 (=360×0.5/11)° and δ becomes 0.18 (=4/360×16) tracks from the equation (4). That is, the recording head 6 is displaced by a distance corresponding to 0.18 tracks in a direction of outer circle from the reproducing head 7.

As the modulation data for wobbling the reproducing head 7, modulation data in the form of a sawtooth wave with a slope of ±A and having one rotation of the magnetic disk as one cycle may be employed, as expressed by the following equation (5).

$$f(\theta) = A \times \theta \quad (0 \leq \theta < \pi/2) \quad (5)$$
$$= A \times \theta - B \quad (\pi/2 \leq \theta < 3\pi/2)$$
$$= A \times \theta - 2 \times B \quad (3\pi/2 \leq \theta < 2\pi)$$

Meanwhile, in the magnetic disk device of this first embodiment, the reproducing head 7 is wobbled using the modulation data from the controller 11, that is, with the servo control being off (in a so-called open loop). However, the reproducing head 7 may also be wobbled by providing reproducing head positioning marks 35 in advance similar to the recording head positioning marks 32, then finding a position error signal from a reproducing signal reproduced from the reproducing head positioning marks 35, and using the position error signal instead of the modulation signal, that is, with the servo control being on (in a so-called closed loop). In this case, with the servo control being on, the reproducing head 7 can be wobbled more precisely than in the foregoing magnetic disk device.

In addition, though the reproducing head 7 is wobbled in reproducing the test data in the magnetic disk device of the first embodiment, the recording head 6 may be wobbled in recording the test data without wobbling the reproducing head 7 in reproducing the test data. That is, in the present invention, either one of the recording head 6 and the reproducing head 7 is wobbled, and the displacement δ between the center of the recording head 6 and that of the reproducing head 7 is calculated on the basis of presence/absence of the error of the reproduced test data.

A second embodiment of the head displacement measuring method, the data recording/reproducing method, the head displacement measuring apparatus, and the data recording/reproducing apparatus according to the present invention will now be described with reference to the drawings.

Figure 6:
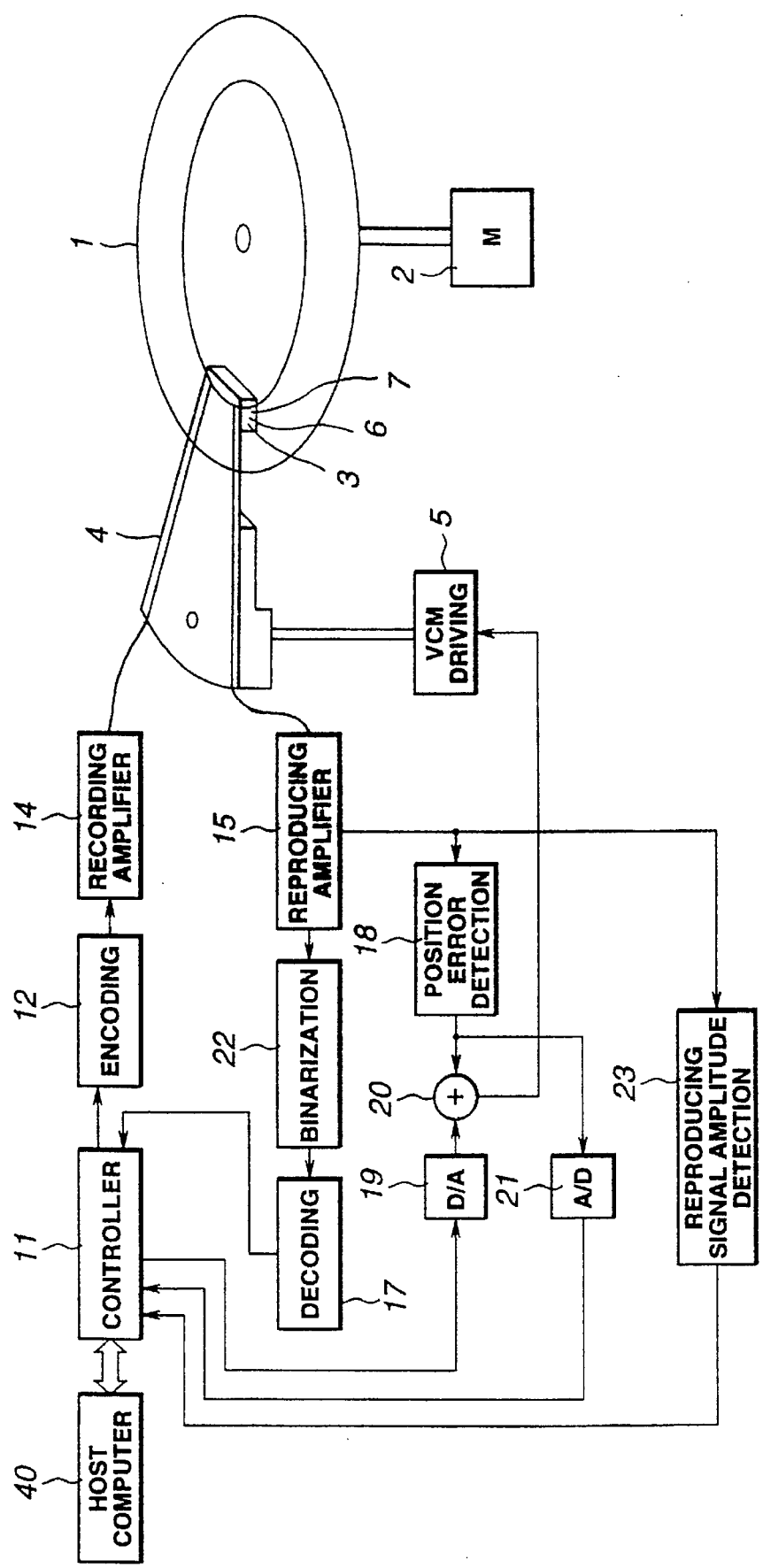
FIG.6 is a block diagram showing a specific structure of essential portions of another magnetic disk device to which the present invention applies.

In this second embodiment, the present invention applies to a magnetic disk device similar to the magnetic disk device of the first embodiment, employing a magnetic disk as a disk-shaped recording medium, an inductive head as a recording head, and a magneto-resistive head as a reproducing head. FIG.6 is a block diagram showing the structure of essential portions of this magnetic disk device, in which circuits having the same function as those of the first embodiment (FIG.1) are denoted by the same reference numerals.

The magnetic disk device of the second embodiment has a controller 11 for generating test data and outputting the test data or data from a host computer 40, an encoding circuit 12 for encoding the data or test data from the controller 11, a recording amplifier 14 for generating a recording signal based upon the data encoded by the encoding circuit 12, a recording head 6 for recording the data on a magnetic disk 1 on the basis of the recording signal from the recording amplifier 14, and a reproducing head 7 for reproducing data from the magnetic disk 1, as shown in FIG.6. The magnetic disk device also has a reproducing amplifier 15 for amplifying a reproducing signal from the reproducing head 7, a binarization circuit 22 for binary connecting the reproducing signal outputting reproducing data, and a decoding circuit 17 for decoding the reproducing data from the binarization circuit 22 to reproduce the original data.

In actual data recording or data reproduction, the controller 11 supplies to the encoding circuit 12 data supplied via an SCSI from the host computer 40.

The encoding circuit 12 encodes the data in accordance with code rules suitable for recording data on the magnetic disk 1, and supplies recording data to the recording amplifier 14.

The recording amplifier 14 generates a recording signal based upon the recording data to drive the recording head 6 by this recording signal.

The magnetic disk device also has a motor 2 for rotationally driving the magnetic disk 1, a head 3 constituted integrally by the recording head 6 and the reproducing head 7, an arm 4 for moving the head 3 in a radial direction of the magnetic disk 1, and a VCM driving circuit 5 for rotationally driving the arm 4, as shown in FIG.6.

The magnetic disk 1 is rotationally driven at a constant angular velocity or constant linear velocity by the motor 2. The arm 4 is rotationally driven about its axis by a VCM driven by the VCM driving circuit 5, to move the head 3 in the radial direction of the magnetic disk 1. The head 3 is moved under servo control as later described, so that the head 3 is positioned, that is, the recording head 6 and the reproducing head 7 are positioned. By providing the recording signal to the recording head 6 which is positioned, a track on which the recording signal based upon the data (hereinafter referred to simply as data) is recorded is formed on the recording surface of the magnetic disk 1.

On the other hand, the data is reproduced from the magnetic disk 1 as follows. The reproducing head 7 is also positioned under servo control. The reproducing head 7 travels on a target track of the magnetic disk 1, to supply the reproducing signal to the reproducing amplifier 15.

The reproducing amplifier 15 is constituted by an amplifier and an equalizer. The reproducing amplifier 15 amplifies the reproducing signal supplied from the reproducing head 7, then equalizes the waveform, and supplies the reproducing signal of equalized waveform to the binarization circuit 22.

The binarization circuit 22 binary connects the reproducing signal supplied from the reproducing amplifier 15 and supplies the resulting reproducing data to the decoding circuit 17.

The decoding circuit 17, corresponding to the encoding circuit 12 in the recording system, decodes the reproducing data supplied from the binarization circuit 22 to reproduce the original data, and supplies the data to the controller 11. The controller 11 outputs the data supplied from the decoding circuit 17 via the SCSI to the host computer 40.

The data recording on the magnetic disk 1 and the data reproduction from the magnetic disk 1 are thus carried out. In this magnetic disk device, displacement between the center of the recording head 6 and that of the reproducing head 7 is measured on the basis of the amplitude of the reproducing signal and is stored in a memory 30 before actual data recording or data reproduction is carried out, for example, immediately after the power is turned on. In the actual data recording or data reproduction, tracking servo control of the recording head 6 or the reproducing head 7 is performed in consideration of the displacement.

Specifically, similar to the first embodiment, 11 sectors from sector #1 to sector #11 are provided on one track 30, as shown in FIG.2. In each of the sectors #1 to #11, data of 512 bytes may be recorded. On each track of the magnetic disk 1, recording head positioning marks 32 for positioning the recording head 6 are formed by being magnetized in a direction opposite to the magnetizing direction of its peripheral portions, above and below the center 31 of the track and in a leading portion of each of the sectors #1 to #11, as shown in FIG.3A.

This magnetic disk device of the second embodiment for recording or reproducing data on or from the magnetic disk 1 has a position error detection circuit 18 for detecting displacement of the reproducing head 7 from the center 31 of the track on the basis of the reproducing signal from the reproducing amplifier 15, a D/A converter 19 for converting modulation data for wobbling the head 3 from the controller 11 into a modulation signal, an adder 20 for adding the position error signal from the position error detection circuit 18 and the modulation signal from the D/A converter 19 to output the added signal to the VCM driving circuit 5, an A/D converter 21 for converting the position error signal from the reproducing amplifier 15 into data and supplying the resulting data to the controller 11, and a reproducing signal amplitude detection circuit 23 for detecting amplitude of the reproducing signal from the reproducing amplifier 15, as shown in FIG.6.

Prior to actual data recording, for example, when the power is turned on, the position error detection circuit 18 detects a difference in level between the reproducing signals from the reproducing amplifier 15 corresponding to the two recording head positioning marks 32 displaced above and below the center 31 of the track. Then, the position error detection circuit 18 supplies to the adder 20 the detected difference in level as the position error signal indicating the displacement of the center of the reproducing head 7 from the center 31 of the track.

The controller 11 supplies the modulation data as all-zero data to the D/A converter 19, which then converts the modulation data to an analog signal and supplies the analog signal to the adder 20. The adder 20 supplies the position error signal from the position error detection circuit 18 directly to the VCM driving circuit 5. The VCM driving circuit 5 drives the VCM for rotationally driving the arm 4 by the position error signal supplied from the adder 20. Thus, the servo control is performed so that the center of the reproducing head 7 constituting the head 3 conforms to the center 31 of the track.

With the center of the reproducing head 7 conforming to the center 31 of the track, the controller 11 supplies 11 sectors of predetermined data, such as, test data composed of identical 512 bytes to the encoding circuit 12. Consequently, the test data is recorded in the sectors #1 to #11 of a recording track 33 of the magnetic disk 1.

As described in the first embodiment, the center of the recording head 6 and that of the reproducing head 7 do not necessarily conform to each other. When the center of the recording head 6 is displaced by $\delta$ from the center of the reproducing head 7, as shown in FIGS.3A and 4A, the test data is recorded in a position displaced by $\delta$ from the center 31 of the track, forming the recording track 33.

Then, the controller 11 supplies to the D/A converter 19 modulation data in the form of sine wave as expressed by the equation (1) for wobbling the reproducing head 7. Consequently, the reproducing head 7 is shifted in the form of sine wave in the radial direction from the center 31 of the track to scan an area 34 of the magnetic disk 1, as shown in FIG.4A. Since the wobbling of the reproducing head 7 may be carried out similarly to the magnetic disk device of the first embodiment, the operation of this wobbling will not be described further in detail.

Figure 7:
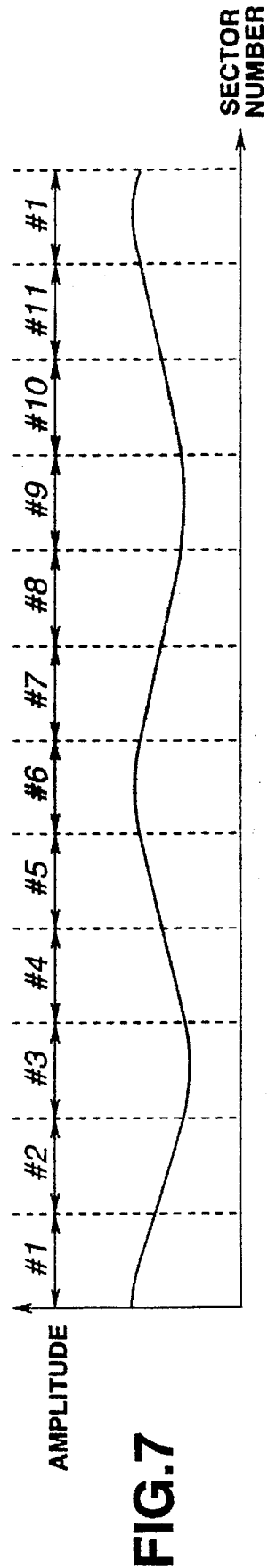
FIG.7 shows a specific example of a reproducing signal corresponding to test data output from the reproducing head constituting the magnetic disk device.

As the reproducing head 7 meanders, the reproducing signal corresponding to the test data reproduced by the reproducing head 7 has smaller amplitude in a portion where the shift of the reproducing head 7 by wobbling is greater, as shown in FIG.7. Thus, the reproducing signal amplitude detection circuit 23 detects the amplitude of the reproducing signal corresponding to the test data supplied from the reproducing amplifier 15, and supplies the detected amplitude to the controller 11. The controller 11 calculates the displacement $\delta$ between the center of the recording head 6 and that of the reproducing head 7 on the basis of the amplitude of the reproducing signal corresponding to the test data supplied from the reproducing signal amplitude detection circuit 23.

That is, the controller 11 detects the displacement $\delta$ between the center of the recording head 6 and that of the reproducing head 7 based on the equation (2), where N denotes the number of sectors in one track, d (=A/2) the maximum shift of the reproducing head 7, and m the sector number having the maximum amplitude of the reproducing signal corresponding to the test data.

Specifically, on the assumption that the number of sectors N is 11, that the maximum shift d is 0.5 tracks, and that the sector number m having the maximum amplitude of the reproducing signal is 5, as shown in FIG.7, $\theta$ becomes 164 (=360×5/11)° and the displacement $\delta$ becomes 0.14 (=0.5×sin 164°) tracks from the equation (2). That is, the recording head 6 is displaced by a distance corresponding to 0.14 tracks in a direction of outer circle (positive direction) from the reproducing head 7. In FIG.7, the axis of abscissas (x-axis) represents the sector number m, and the axis of ordinates (y-axis) represents the amplitude value of the reproducing signal. If the track pitch is 10.0 μm, the recording head 6 is displaced by 1.4 (=10.0×0.14) μm from the reproducing head 7. Thus, also in the magnetic disk device of the second embodiment, the displacement $\delta$ between the center of the recording head 6 and that of the reproducing head 7 can be correctly detected with a simple circuit structure. This magnetic disk device is also responsive to temporal changes of the displacement $\delta$ by periodically measuring the displacement $\delta$ between the center of the recording head 6 and that of the reproducing head 7 when the power is turned on or when the data recording or reproduction is not carried out. Stated differently, the displacement $\delta$ need not be measured on the manufacturing stage, and the displacement $\delta$ may be easily measured on the basis of the amplitude of reproducing signal so that the production costs may be reduced.

On completion of calculation of the displacement $\delta$ between the center of the recording head 6 and that of the reproducing head 7, the controller 11 corrects the position of the recording head 6 or the reproducing head 7 on the basis of the calculated displacement $\delta$ in actual data recording or data reproduction.

That is, the controller 11 supplies data corresponding to the displacement $\delta$ as an offset to the D/A converter 19. The adder 20 adds this offset of a constant value to the position error signal changed by external disturbance from the position error detection circuit 18, and supplies the added value to the VCM driving circuit 5.

The specific technique for correcting the position of the recording head 6 and the reproducing head 7 is exemplified by the technique of recording data with the offset given to the recording head 6 in data recording and reproducing the data without giving the offset to the reproducing head 7 in data reproduction, and conversely, the technique of recording data without giving the offset to the recording head 6 in data recording and reproducing the data with the offset given to the reproducing head 7 in data reproduction, as described in the first embodiment. These techniques will not be described further in detail.

In the magnetic disk device of this second embodiment, similar to the magnetic disk device of the first embodiment, even when the center of the recording head 6 is displaced from that of the reproducing head 7 or vice versa, the recording head 6 and the reproducing head 7 scan the same position so that the data can be correctly reproduced. In addition, even when the magnetic disk devices having different displacements $\delta$ are employed, the data can be correctly reproduced by measuring the displacement $\delta$ when the power is turned on, as described above.

Meanwhile, though the reproducing head 7 is positioned using the recording head positioning marks 32 in recording the test data in the magnetic disk device of the second embodiment, the reproducing head 7 may also be positioned tentatively at the center 31 of the track without using the recording head positioning marks 32, as in the magnetic disk device of the first embodiment.

Figure 8:
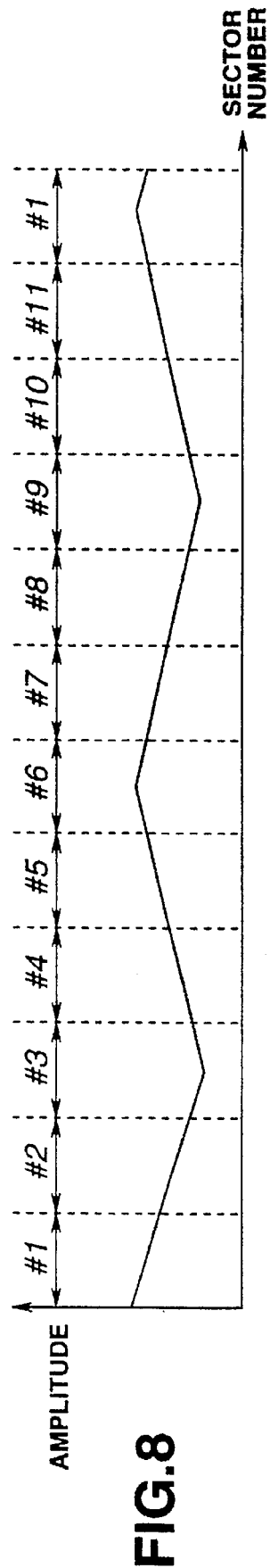
FIG.8 shows another example of the reproducing signal corresponding to the test data output from the reproducing head.

Also in this magnetic disk device, the modulation data in the form of triangular wave expressed by the equation (3)

and the modulation data in the form of sawtooth wave expressed by the equation (5) may be used as the modulation data for wobbling the reproducing head 7, as in the magnetic disk device of the first embodiment. When the modulation data of triangular wave is employed, the amplitude of the reproducing signal corresponding to the test data outputted from the reproducing head 7 exhibits a shape as shown in FIG.8.

In addition, in this magnetic disk device, the reproducing head 7 may also be wobbled by providing reproducing head positioning marks 35 in advance similar to the recording head positioning marks 32, then finding a position error signal from a reproducing signal from the reproducing head positioning marks 35, and using the position error signal instead of the modulation signal, that is, with the servo control being on (in a so-called closed loop), as shown in FIG.3A. In this case, with the servo control being on, the reproducing head 7 can be wobbled more precisely. Conversely, the test data may be first recorded while the recording head 6 is wobbled using the marks 32 as the reproducing head positioning marks and the marks 35 as the recording head positioning marks, and then the test data may be reproduced by the reproducing head. That is, in the present invention, either one of the recording head 6 and the reproducing head 7 is wobbled, and the displacement δ between the center of the recording head 6 and that of the reproducing head 7 is detected on the basis of the amplitude of the reproducing signal corresponding to the reproduced test data.

A third embodiment of the head displacement measuring method, the data recording/reproducing method, the head displacement measuring apparatus, and the data recording/reproducing apparatus according to the present invention will now be described with reference to the drawings.

Figure 9:
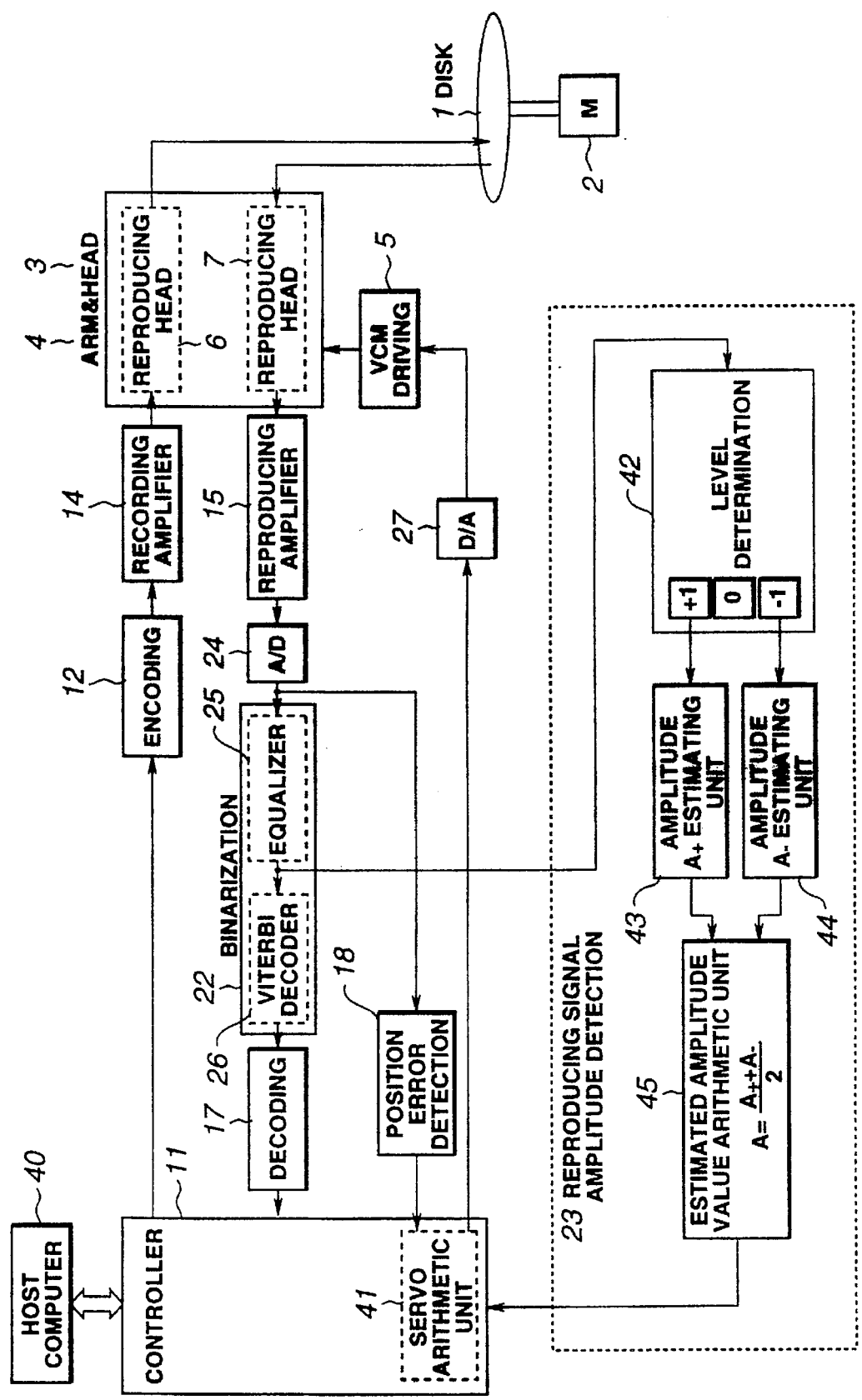
FIG.9 is a block diagram showing a specific structure of essential portions of another magnetic disk device to which the present invention applies.

In this third embodiment, the present invention applies to a magnetic disk device similar to the magnetic disk device of the first and second embodiments, employing a magnetic disk as a disk-shaped recording medium, an inductive head as a recording head, and a magneto-resistive head as a reproducing head. In the magnetic disk device of the third embodiment, part of the servo control circuit constituted by the D/A converter 19, the adder 20 and the A/D converter 21 of the magnetic disk device of the second embodiment is provided inside of the controller 11. FIG.9 is a block diagram showing the structure of essential portions of this magnetic disk device, in which circuits having the same function as those of the second embodiment (FIG.8) are denoted by the same reference numerals.

The magnetic disk device of the third embodiment has a controller 11 for generating test data and outputting the test data or data from a host computer 40, an encoding circuit 12 for encoding the data or test data from the controller 11, a recording amplifier 14 for generating a recording signal based upon the data encoded by the encoding circuit 12, a recording head 6 for recording the data on a magnetic disk 1 on the basis of the recording signal from the recording amplifier 14, and a reproducing head 7 for reproducing data from the magnetic disk 1, as shown in FIG.9. The magnetic disk device also has a reproducing amplifier 15 for amplifying a reproducing signal from the reproducing head 7, an A/D converter 24 for digitizing the reproducing signal from the reproducing amplifier 15, a binarization circuit 22 for binary connecting the reproducing signal digitized by the A/D converter 24 and outputting reproducing data, and a decoding circuit 17 for decoding the reproducing data from the binarization circuit 22 to reproduce the original data.

In actual data recording or data reproduction, the controller 11 supplies to the encoding circuit 12 data supplied via a so-called small computer system interface (SCSI) from the host computer 40.

The encoding circuit 12 encodes the data in accordance with code rules suitable for recording data on the magnetic disk 1, and supplies the resulting recording data to the recording amplifier 14.

The recording amplifier 14 generates a recording signal based upon the recording data to drive the recording head 6 by this recording signal.

The magnetic disk device also has a motor 2 for rotationally driving the magnetic disk 1, a head 3 constituted integrally by the recording head 6 and the reproducing head 7, an arm 4 for moving the head 3 in a radial direction of the magnetic disk 1, and a voice coil motor (VCM) driving circuit 5 for rotationally driving the arm 4, as shown in FIG.9.

The magnetic disk 1 is rotationally driven at a constant angular velocity or constant linear velocity by the motor 2. The arm 4 is rotationally driven about its axis by a VCM driven by the VCM driving circuit 5, to move the head 3 in the radial direction of the magnetic disk 1. The head 3 is moved under servo control as later described, so that the head 3 is positioned, that is, the recording head 6 and the reproducing head 7 are positioned. By providing the recording signal to the recording head 6 which is positioned, a track on which the recording signal based upon the data (hereinafter referred to simply as data) is recorded is formed on the recording surface of the magnetic disk 1.

On the other hand, the data is reproduced from the magnetic disk 1 as follows. The reproducing head 7 is also positioned under servo control. The reproducing head 7 travels on a target track of the magnetic disk 1, to supply the reproducing signal to the reproducing amplifier 15.

The reproducing amplifier 15 amplifies the reproducing signal supplied from the reproducing head 7, and supplies the amplified reproducing signal to the A/D converter 24. The A/D converter 24 samples the reproducing signal from the reproducing amplifier 15 with a predetermined frequency, and converts the sampled value to a digital signal to supply the digital signal to the binarization circuit 22.

The binarization circuit 22 has a digital equalizer 25 and a Viterbi decoder 26, as shown in FIG.9. The digital equalizer 25 equalizes waveform of the reproducing signal using the digitized sampled value (hereinafter referred to simply as sampled value). The Viterbi decoder 26 binary connects the reproducing signal of equalized waveform by maximum likelihood decoding, and supplies the resulting reproducing data to the decoding circuit 17.

The decoding circuit 17, corresponding to the encoding circuit 12 in the recording system, decodes the reproducing data to output and supply the original data to the controller 11. The controller 11 outputs the data supplied from the decoding circuit 17 via the SCSI to the host computer 40.

The data recording on the magnetic disk 1 and the data reproduction from the magnetic disk 1 are thus carried out. In this magnetic disk device, displacement between the center of the recording head 6 and that of the reproducing head 7 is measured on the basis of the amplitude of the reproducing signal and is stored in a memory 30 before actual data recording or data reproduction is carried out, for example, immediately after the power is turned on. In the actual data recording or data reproduction, tracking servo control of the recording head 6 or the reproducing head 7 is performed in consideration of the displacement.

Specifically, similar to the first embodiment, 11 sectors from sector #1 to sector #11 are provided on one track 30, as shown in FIG.2. On each of the sectors #1 to #11, data of 512 bytes may be recorded. In each track of the magnetic disk 1, recording head positioning marks 32 for positioning the recording head 6 are formed by being magnetized in a direction opposite to the magnetizing direction of its peripheral portions, above and below the center 31 of the track and in a leading portion of each of the sectors #1 to #11, as shown in FIG.3A.

This magnetic disk device of the third embodiment for recording or reproducing data on or from the magnetic disk 1 has a position error detection circuit 18 for detecting displacement of the reproducing head 7 from the center 31 of the track on the basis of the sampled value from the A/D converter 24, a D/A converter 27 for converting modulation data for wobbling the head 3 from the controller 11 into an analog signal, and a reproducing signal amplitude detection circuit 23 for detecting the amplitude of the reproducing signal on the basis of the sampled value from the digital equalizer 25, as shown in FIG.9.

Prior to actual data recording, for example, when the power is turned on, the position error detection circuit 18 detects a difference in level between the reproducing signals of the two recording head positioning marks 32 displaced above and below the center 31 of the track on the basis of the sampled value from the A/D converter 24. Then, the position error detection circuit 18 supplies to the controller 11 the detected difference in level as a position error signal indicating the displacement of the center of the reproducing head 7 from the center 31 of the track.

The controller 11 has a servo arithmetic unit 41 for servo control therein. The servo arithmetic unit 41 generates the modulation data as all-zero data, and adds the modulation data to the position error signal from the position error signal detection circuit 18 to supply the added output to the D/A converter 27. The D/A converter 27 converts the output of the servo arithmetic unit 41 to an analog signal and supplies the signal to the VCM driving circuit 5. Accordingly, the servo arithmetic unit 41 supplies the position error signal from the position error detection circuit 18 directly to the VCM driving circuit 5 via the D/A converter 27. The, the VCM driving circuit 5 drives the VCM for rotationally driving the arm 4 by the position error signal supplied from the D/A converter 27. Thus, the servo control is performed so that the center of the reproducing head 7 constituting the head 7 conforms to the center 31 of the track.

With the center of the reproducing head 7 conforming to the center 31 of the track, the controller 11 supplies 11 sectors of predetermined data, such as, test data composed of identical 512 bytes to the encoding circuit 12. Consequently, the test data is recorded in the sectors #1 to #11 of a recording track 33 of the magnetic disk 1.

Meanwhile, the center of the recording head 6 and that of the reproducing head 7 do not necessarily conform to each other, as described in the conventional technique. When the center of the recording head 6 is displaced by δ from the center of the reproducing head 7, as shown in FIGS.3A and 4A, the test data is recorded in a position displaced by δ from the center 31 of the track, forming the recording track 33.

Then, the servo arithmetic unit 41 of the controller 11 generates modulation data in the form of a sine wave as expressed by the equation (1) for wobbling the reproducing head 7, then adds the modulation data to the position error signal from the position error detection circuit 18, and supplies the added output to the D/A converter 27. Since the position error signal is 0 with the tracking servo being on, the servo arithmetic unit 41 supplies the resulting modulation data directly to the D/A converter 27, and the D/A converter 27 supplies the modulation signal to the VCM driving circuit 5. Consequently, as shown in FIG.4A, the reproducing head 7 shifts in the shape of a sine wave in the radial direction from the center 31 of the track to scan an area 34 of the magnetic disk 1. Since the wobbling of the reproducing head 7 may be carried out in a manner similar to the magnetic disk device of the first embodiment, the operation thereof will not be described further in detail.

The reproducing signal corresponding to the test data reproduced by the meandering reproducing head 7 has a smaller amplitude in a portion where the shift of the reproducing head 7 by wobbling is greater, as shown in FIG.7. Thus, the reproducing signal amplitude detection circuit 23 detects the amplitude of the reproducing signal corresponding to the test data on the basis of the sampled value supplied from the digital equalizer 25, and supplies the detected amplitude to the controller 11.

Specifically, the reproducing signal amplitude detection circuit 23 has a level determination circuit 42 for determining the level of the sampled value supplied from the digital equalizer 25, an amplitude estimating unit 43, an amplitude estimating unit 44, and an estimated amplitude arithmetic unit 45 for calculating a mean value of outputs of the amplitude estimating units 43, 44, as shown in FIG.9.

Figure 10C:
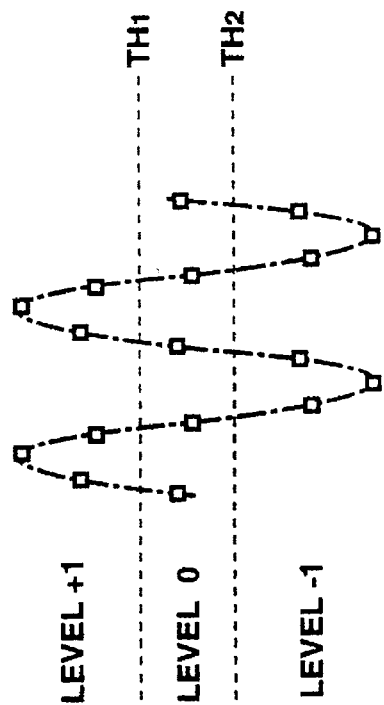
FIGS.10A to 10C are views for explaining level determination of the reproducing signal in the magnetic disk device.
Figure 10B:
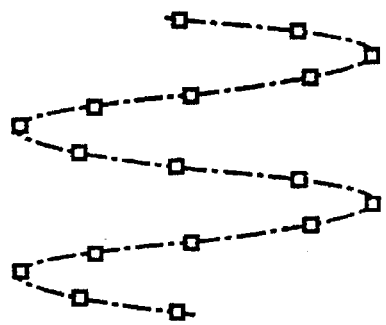
Figure 10A:
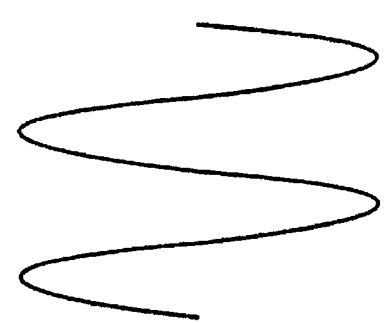

The level determination unit 42 compares the sampled values from the digital equalizer 25 as shown in FIG.10B with two predetermined threshold values $TH_1$, $TH_2$, as shown in FIG.10C, to determine the level of the sampled values. That is, when the sampled value is not smaller than the threshold $TH_1$, the level of the sampled value is set to +1. When the sampled value is not greater than the threshold $TH_2$, the level of the sampled value is set to −1. When the sampled value is between the thresholds $TH_1$ and $TH_2$, the level of the sampled value is set to 0. The level determination unit 42 supplies the sampled value of the level +1 as $X_{+,k}$ with k being an integer to the amplitude estimating unit 43, and supplies the sampled value of the level −1 as $X_{-,k}$ to the amplitude estimating unit 44.

The amplitude estimating unit 43 calculates an estimated value $A_{+,k}$ using the sampled value $X_{+,k}$ supplied from the level determination unit 42 in accordance with the following equation (6) every time the sampled value is determined to be at the level +1 by the level determination unit 42.

$$A_{+,k}=A_{+,k-1}+\beta b(X_{+,k}-A_{+,k-1}) \quad (8)$$

In this equation, β (0≤β<1) is a correction coefficient. That is, the amplitude estimating unit 43 updates the estimated value $A_{+,k}$ every time the sampled value is determined to be at the level +1 by the level determination unit 42. The amplitude estimating unit 43 retains the previous value when it does not carry out updating.

The amplitude estimating unit 44 calculates an estimated value $A_{-,k}$ using the sampled value $X_{-,k}$ supplied from the level determination unit 42 in accordance with the following equation (7) every time the sampled value is determined to be at the level −1 by the level determination unit 42.

$$A_{-,k}=A_{-,k-1}+\beta(X_{-,k}-A_{-,k-1}) \quad (7)$$

That is, the amplitude estimating unit 44 updates the estimated value $A_{-,k}$ every time the sampled value is determined to be at the level −1 by the level determination unit 42. The amplitude estimating unit 44 retains the previous value when it does not carry out updating.

The estimated values $A_{+,k}$, $A_{-,k}$ thus calculated are sequentially supplied to the estimated amplitude arithmetic unit 45.

The estimated amplitude arithmetic unit 45 calculates an estimated amplitude value C indicating the amplitude of the reproducing signal corresponding to the test data from the estimated values $A_{+,k}$, $A_{-,k}$ supplied from the amplitude estimating units 43, 44 in accordance with the following equation (8).

$$C=(A_{+,k}+A_{-,k})/2 \qquad (8)$$

The estimated amplitude arithmetic unit 45 supplies the estimated amplitude value C to the controller 11.

The controller 11 calculates the displacement δ between the center of the recording head 6 and that of the reproducing head 7 on the basis of the estimated amplitude value C supplied from the reproducing signal amplitude detection circuit 23.

That is, the controller 11 detects the displacement δ between the center of the recording head 6 and that of the reproducing head 7 based on the equation (2) in which N denotes the number of sectors in one track, d (=A/2) the maximum shift of the reproducing head 7, and m the sector number having the maximum estimated amplitude value C indicating the amplitude of the reproducing signal corresponding to the test data.

Specifically, on the assumption that the number of sectors N is 11, that the maximum shift d (=A/2) is 0.5 tracks, and that the sector number having the maximum estimated amplitude value C is 5, δ becomes 164 (=360×5/11)° and the displacement δ becomes 0.14 (=0.5×sin 164°) tracks from the equation (2). That is, the recording head 6 is displaced by a distance corresponding to 0.14 tracks in a direction of outer circle (positive direction) from the reproducing head 7. If the track pitch is 10.0 μm, the recording head 6 is displaced by 1.4 (=10.0×0.14) μm from the reproducing head 7. It is to be understood that the foregoing technique for estimating the amplitude value is simply one example, and that the estimated amplitude value C may be found by using a simple filter, for example, by employing a technique of finding a sequential mean value of the sampled values.

Thus, also in the magnetic disk device of the third embodiment, the displacement δ between the center of the recording head 6 and that of the reproducing head 7 can be correctly detected with a simple circuit structure. This magnetic disk device is also responsive to temporal changes of the displacement δ by periodically measuring the displacement δ between the center of the recording head 6 and that of the reproducing head 7 when the power is turned on or when the data recording or reproduction is not carried out. Stated differently, the displacement δ need not be measured on the manufacturing stage, and the displacement δ may be easily measured on the basis of the amplitude of the reproducing signal so that the production costs may be reduced.

On completion of calculation of the displacement δ between the center of the recording head 6 and that of the reproducing head 7, the controller 11 corrects the position of the recording head 6 or the reproducing head 7 on the basis of the calculated displacement δ in actual data recording or data reproduction.

Specifically, the servo arithmetic unit 41 of the controller 11 generates the data corresponding to the displacement δ as an offset, and adds this constant offset to the position error signal changed by external disturbance from the position error detection circuit 18. The servo arithmetic unit 41 then supplies the added output to the VCM driving circuit 5 via the D/A converter 27.

The magnetic disk device of the third embodiment differs from the magnetic disk devices of the first and second embodiments in that the servo arithmetic unit 41 provided within the controller 11 carries out calculation of the displacement δ and correction of the position of the recording head 6 or the reproducing head 7. However, the specific technique for correcting the position of the recording head 6 and the reproducing head 7 is exemplified by the technique of recording data with the offset given to the recording head 6 in data recording and reproducing the data without giving the offset to the reproducing head 7 in data reproduction, and conversely, the technique of recording data without giving the offset to the recording head 6 in data recording and reproducing the data with the offset given to the reproducing head 7 in data reproduction, as described in the first embodiment. These techniques will not be described further in detail.

In the magnetic disk device of the third embodiment, similar to the magnetic disk device of the first embodiment, even when the center of the recording head 6 is displaced from that of the reproducing head 7 or vice versa, the recording head 6 and the reproducing head 7 scan the same position so that the data can be correctly reproduced. In addition, even when the magnetic disk devices having different displacements δ are employed, the data can be correctly reproduced by measuring the displacement δ when the power is turned on, as described above.

Meanwhile, though the reproducing head 7 is positioned using the recording head positioning marks 32 in recording the test data in the magnetic disk device of the third embodiment, the reproducing head 7 may also be positioned tentatively at the center 31 of the track without using the recording head positioning marks 32, as in the magnetic disk device of the first embodiment.

Also in this magnetic disk device, the modulation data in the form of a triangular wave expressed by the equation (3) and the modulation data in the form of a sawtooth wave expressed by the equation (5) may be used as the modulation data for wobbling the reproducing head 7, as in the magnetic disk device of the first embodiment. When the modulation data of a triangular wave is employed, the amplitude of the reproducing signal corresponding to the test data outputted from the reproducing head 7 exhibits a shape as shown in FIG.8.

In addition, in this magnetic disk device, the reproducing head 7 may also be wobbled by providing reproducing head positioning marks 35 in advance similar to the recording head positioning marks 32, then finding a position error signal from a reproducing signal from the reproducing head positioning marks 35, and using the position error signal instead of the modulation signal, that is, with the servo control being on (in a so-called closed loop), as shown in FIG.3A. In this case, with the servo control being on, the reproducing head 7 can be wobbled more precisely. Conversely, the test data may be first recorded while the recording head 6 is wobbled using the marks 32 as the reproducing head positioning marks and the marks 35 as the recording head positioning marks, and then the test data may be reproduced by the reproducing head. That is, in the present invention, either one of the recording head 6 and the reproducing head 7 is wobbled, and the displacement δ between the center of the recording head 6 and that of the reproducing head 7 is detected on the basis of the amplitude of the reproducing signal corresponding to the reproduced test data.

It is to be understood that the present invention is not limited to the above-described embodiments, and that the present invention may also apply to a magneto-optical disc device employing a magneto-optical disc as a disc-shaped recording medium and a so-called two-beam optical head.

What is claimed is:

1. A head displacement measuring method for determining displacement between a recording head and a separate reproducing head of apparatus for recording on and reproducing from a disk-shaped recording medium, the method comprising steps of:

supplying power to the apparatus and then performing the following calibration:

recording test data in a disk-shaped recording medium using the recording head;

continuously wobbling the reproducing head in a radial direction of the disk-shaped recording medium and reproducing the recorded test data from the disk-shaped recording medium using the reproducing head; and detecting displacement between the recording head and the reproducing head on the basis of the reproduced test data.

2. The head displacement measuring method as claimed in claim 1, wherein the displacement between the recording head and the reproducing head is detected by determining a presence/absence of an error in the reproduced test data.

3. The head displacement measuring method as claimed in claim 1, wherein the displacement between the recording head and the reproducing head is detected by determining a bit error rate of the reproduced test data.

4. A head displacement measuring method for determining displacement between a recording head and a separate reproducing head of apparatus for recording on and reproducing from a disk-shaped recording medium, the method comprising steps of:

supplying power to the apparatus and then performing the following calibration:

continuously wobbling the recording head in a radial direction of a disk-shaped recording medium and recording test data in the disk-shaped recording medium using the recording head;

reproducing the recorded test data from the disk-shaped recording medium using the reproducing head; and detecting displacement between the recording head and the reproducing head on the basis of the reproduced test data.

5. The head displacement measuring method as claimed in claim 4, wherein the displacement between the recording head and the reproducing head is detected by determining a presence/absence of an error in the reproduced test data.

6. The head displacement measuring method as claimed in claim 4, wherein the displacement between the recording head and the reproducing head is detected by determining a bit error rate of the reproduced test data.

7. A data recording/reproducing method comprising for determining a displacement between a recording head and a separate reproducing head of apparatus for recording on and reproducing from a disk-shaped recording medium, the method comprising steps of:

supplying power to the apparatus and then performing the following calibration:

performing a preliminary step prior to actual data recording or data reproduction of recording test data in the disk-shaped recording medium using the recording head;

continuously wobbling the reproducing head in a radial direction of the disk-shaped recording medium and reproducing the test data from the disk-shaped recording medium using the reproducing head;

detecting displacement between the recording head and the reproducing head on the basis of the reproduced test data; and performing an operational step during the actual data recording or data reproduction of correcting a position of one of the recording head and the reproducing head on the basis of the detected displacement.

8. A data recording/reproducing method for determining displacement between a recording head and a separate reproducing head of apparatus for recording on and reproducing from a disk-shaped recording medium, the method comprising steps of:

supplying power to the apparatus and then performing the following calibration:

performing a preliminary step prior to actual data recording or data reproduction of continuously wobbling the recording head in a radial direction of the disk-shaped recording medium and recording test data in the disk-shaped recording medium using the recording head;

reproducing the test data from the disk-shaped recording medium using the reproducing head;

detecting displacement between the recording head and the reproducing head on the basis of the reproduced test data; and performing an operational step during the actual data recording or data reproduction of correcting a position of one of the recording head and the reproducing head on the basis of the detected displacement.

9. A head displacement measuring apparatus comprising:

power supply means for said apparatus;

means for turning said power supply means ON;

a recording head for recording test data in a disk-shaped recording medium;

a separate reproducing head being continuously wobbled in a radial direction of the disk-shaped recording medium to reproduce the recorded test data from the disk-shaped recording medium; and head displacement detection means responsive to turning said power supply means ON for detecting a displacement between the recording head and the reproducing head on the basis of the test data reproduced using the reproducing head.

10. The head displacement measuring apparatus as claimed in claim 9, wherein the head displacement detection means detects the displacement between the recording head and the reproducing head by determining a presence/absence of an error in the reproduced test data.

11. The head displacement measuring apparatus as claimed in claim 9, wherein the head displacement detection means detects the displacement between the recording head and the reproducing head by determining a bit error rate of the reproduced test data.

12. A head displacement measuring apparatus comprising:

power supply means for said apparatus;

means for turning said power supply means ON;

a recording head being continuously wobbled in a radial direction of a disk-shaped recording medium for recording test data in the disk-shaped recording medium;

a separate reproducing head for reproducing the recorded test data from the disk-shaped recording medium; and head displacement detection means responsive to turning said power supply means ON for detecting a displacement between the recording head and the reproducing head on the basis of the test data reproduced by the reproducing head.

13. The head displacement measuring apparatus as claimed in claim 12, wherein the head displacement detection means detects the displacement between the recording head and the reproducing head by determining a presence/absence of an error in the reproduced test data.

14. The head displacement measuring apparatus as claimed in claim 12, wherein the head displacement detection means detects the displacement between the recording head and the reproducing head by determining a bit error rate of the reproduced test data.

15. A data recording/reproducing apparatus comprising:

power supply means for said apparatus;

means for turning said power supply means ON;

a recording head for recording data in a disk-shaped recording medium;

a separate reproducing head for reproducing data from the disk-shaped recording medium;

wobbling means for continuously wobbling the reproducing head in a radial direction of the disk-shaped recording medium; and correction means responsive to turning said power supply means ON and operable before an actual data recording or data reproduction for recording test data in the disk-shaped recording medium by the recording head, for controlling wobbling of the reproducing head by the wobbling means upon reproducing the test data from the disk-shaped recording medium, for detecting displacement between the recording head and the reproducing head on the basis of the reproduced test data, and operable during the actual data recording or data reproduction for correcting a position of one of the recording head and the reproducing head on the basis of the detected displacement.

16. A data recording/reproducing apparatus comprising:

power supply means for said apparatus;

means for turning said power supply means ON;

a recording head for recording data in a disk-shaped recording medium;

a separate reproducing head for reproducing data from the disk-shaped recording medium;

wobbling means for continuously wobbling the recording head in a radial direction of the disk-shaped recording medium; and correction means responsive to turning said power supply means ON and operable before recording or reproduction of real as opposed to test data for controlling wobbling of the recording head by the wobbling means to record test data in the disk-shaped recording medium, for controlling reproducing the test data from the disk-shaped recording medium by the reproducing head, for detecting displacement between the recording head and the reproducing head on the basis of the reproduced test data, and operable during the actual data recording or data reproduction for correcting a position of one of the recording head and the reproducing head on the basis of the detected displacement.

* * * * *